Dec. 23, 1930.                R. Y. McCULLOUGH                1,786,310
                                CONTROL SYSTEM
                              Filed Jan. 29, 1929
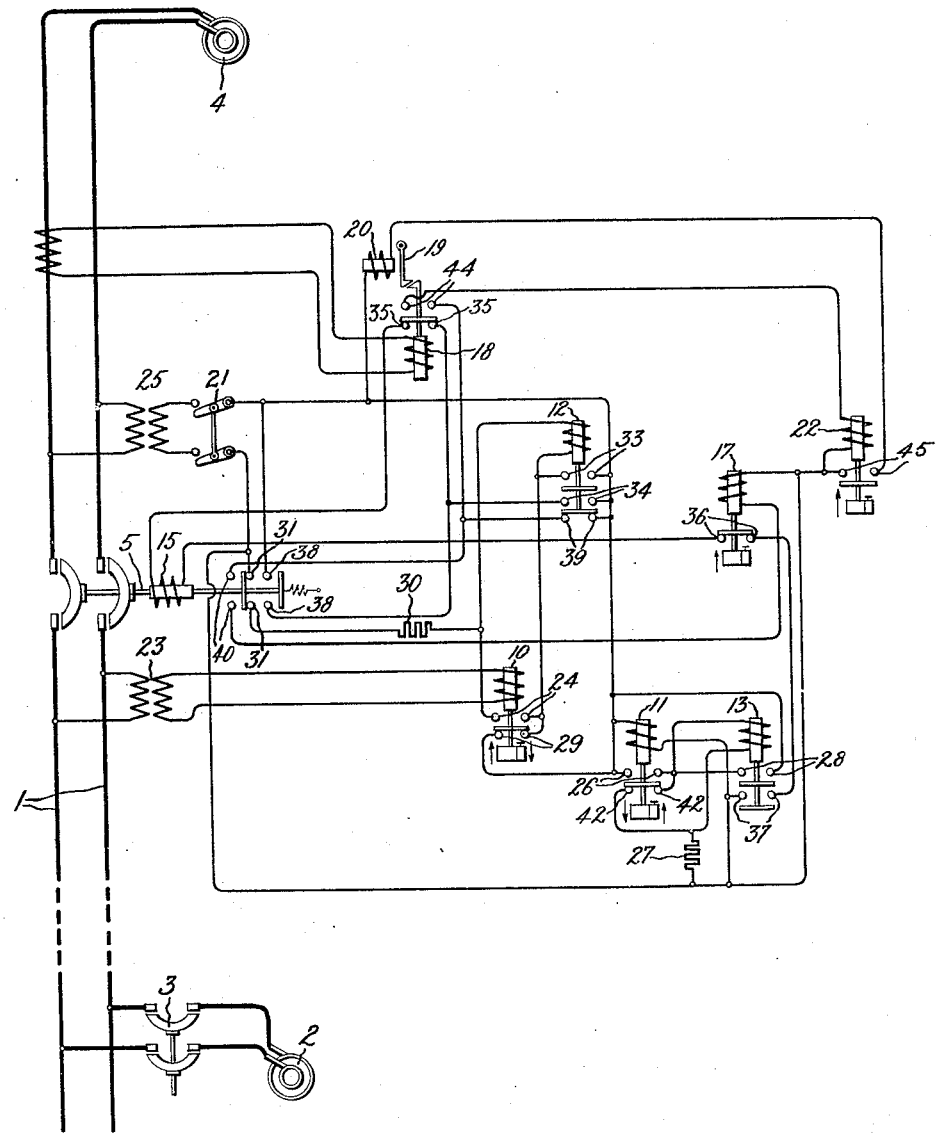
Inventor:
Robert Y. McCullough,
by Charles E. Tullar
   His Attorney.

Patented Dec. 23, 1930

1,786,310

UNITED STATES PATENT OFFICE

ROBERT Y. McCULLOUGH, OF SCHENECTADY, NEW YORK, ASSIGNOR TO GENERAL ELECTRIC COMPANY, A CORPORATION OF NEW YORK

CONTROL SYSTEM

Application filed January 29, 1929. Serial No. 335,955.

My invention relates to automatic control systems and particularly to a system for controlling the connections between an electric circuit which is normally supplied by a preferred source of current and an auxiliary source of current which is arranged to be connected to the electric circuit when the preferred source fails and one object of my invention is to provide an improved arrangement for controlling the connections between the auxiliary source and the electric circuit in such a system so as to maintain the electric circuit energized from the preferred source as much as possible.

In certain systems of distribution such as railway signalling systems it is the practice normally to divide the supply circuit into a plurality of sections which are energized independently of each other in order that a fault on any section may not affect the whole system. When the source supplying any section in such a system fails it is the practice to connect the deenergized section to an auxiliary source, if it is energized. In some cases, however, such for example where the cost of the power received from the auxiliary source is materially higher than the cost of the power received from the normal source, it is desirable to have the auxiliary source connected to the section for only as short a time as possible. In accordance with my invention, I provide an arrangement whereby the auxiliary source is connected to the section when the voltage across the section remains below a predetermined value for a predetermined time and whereby the auxiliary source is periodically disconnected from the section after it has been connected thereto for a predetermined length of time so that if the deenergized section is reenergized from its normal source within a predetermined time after the auxiliary source is disconnected therefrom, the auxiliary source remains disconnected therefrom.

My invention will be better understood from the following description when taken in connection with the accompanying drawing which shows diagrammatically a system of distribution embodying my invention and its scope will be pointed out in the appended claims.

Referring to the accompanying drawing, 1 represents an electric circuit which is normally energized by a suitable source of current 2. As shown, the circuit 1 is connected to the source 2 by means of a suitable circuit breaker 3.

In order to supply current to the circuit 1 when the source 2 fails, I provide an auxiliary source 4 which is arranged to be connected to the circuit 1 by means of a suitable circuit breaker 5.

As long as the circuit 1 is independently energized by its preferred source 2, it is desirable to keep the auxiliary source disconnected therefrom. When, however, the source 2 fails, it is desirable to connect the auxiliary source 4 to the circuit 1 and to disconnect the auxiliary source from the circuit 1 as soon as the preferred source can supply current thereto.

In the arrangement shown in the drawing, I accomplish these results by providing the voltage relays 10 and 11 which are respectively responsive to the voltages of the circuits 1 and the source 4. The voltage relay 10 is arranged to complete across the auxiliary source 4 an energizing circuit for a control relay 12 when the voltage across the circuit 1 remains below a predetermined value for a predetermined time and is arranged to effect the deenergization of the control relay 12 when the voltage across the circuit 1 remains above a predetermined value for a predetermined time. The voltage relay 11 is arranged to complete across the auxiliary source 4 an energizing circuit for the control relay 13 when the voltage across the source 4 remains above a predetermined value for a predetermined time and to effect the deenergization of the control relay 13 when the voltage across the source 4 remains below a predetermined value for a predetermined time.

When both of the control relays 12 and 13 are simultaneously energized, an energizing circuit is completed for the closing coil 15 of the circuit breaker 5. Therefore, whenever the voltage of the circuit 1 remains below a predetermined value for a predetermined time while the auxiliary source 4 is energized, the circuit breaker 5 is closed to connect the auxiliary source 4 to the deenergized circuit 1.

In order to effect the opening of the circuit breaker 5 after current has been supplied from the auxiliary source 4 to the circuit 1 for a predetermined length of time, I provide a time relay 17 which is arranged to be energized in response to the closing of the circuit breaker 5. After the time relay 17 has been energized a predetermined length of time it is arranged to open the energizing circuit of the closing coil 15 so that the circuit breaker 5 opens and disconnects the auxiliary source 4 from the circuit 1. If the circuit 1 is not reenergized by the source 2 within a predetermined time after the opening of the circuit breaker 5 the control relays 12 and 13 again effect the closing of the circuit breaker 5.

The circuit breaker 3 between the preferred source 2 and the circuit 1 may be controlled in any suitable manner examples of which are well known in the art. Preferably this circuit breaker 3 is arranged to be opened automatically in response to either an overload or an under-voltage and to be reclosed either automatically or manually when the voltage of the source 2 is above a predetermined value and the voltage of the circuit 1 remains below a predetermined value for a predetermined time. Suitable control arrangements for accomplishing these results either automatically or manually are old and well known in the art.

In order to open the circuit breaker 5 in response to a fault on the circuit 1 when it is being supplied from the auxiliary source 4, I provide a lockout relay 18 which is connected in any suitable manner so that its operating coil is energized in accordance with the current flowing through the circuit breaker 5. When the current through the circuit breaker 5 exceeds a predetermined value the lockout relay 18 operates and effects the deenergization of the closing coil 15 so that the circuit breaker 5 opens. The lockout relay 18 is designed in any suitable manner so that it maintains the circuit of the closing coil 15 open after the operating coil of the lockout relay has been deenergized. As shown, the relay 18 is held in its lockout position by a latch 19 which is arranged to be released when a release magnet 20 is energized. In the particular arrangement shown in the drawing, the release magnet 20 is arranged to be energized when the circuit 1 is energized by the source 2 and the auxiliary source 4 is energized. This result is accomplished by means of a time relay 22 which is arranged to be connected across the source 4 after the circuit 1 has been energized a predetermined length of time from the source 2 while the lockout relay 18 is in its lockout position. The time relay 22 when energized a predetermined length of time is arranged to complete an energizing circuit for the release magnet 20 to reset the lockout relay 18.

The operation of the arrangement shown in the drawing is as follows: When the circuit 1 is energized by its preferred source 2 the voltage relay 10, which is connected to the secondary of a potential transformer 23 the primary of which is connected across the circuit 1, maintains its contacts 24 closed so that the coil of the control relay 12 is shunted. When the auxiliary source 4 is energized, the voltage relay 11, which is connected by a control switch 21 across the secondary of a potential transformer 25 the primary of which is connected across the auxiliary source 4, maintains its contacts 26 closed so that the control relay 13 is energized. This energizing circuit for the control relay 13 is from one secondary terminal of the transformer 25 through control switch 21 the contacts 26 of the relay 11, coils of relay 13, resistor 27, control switch 21 to the other secondary terminal of the transformer 25. Relay 13, by closing its contacts 28, completes a locking circuit for itself independently of the contacts 26 so that the relay 13 is not deenergized by the voltage relay 11 opening its contacts 26.

When the voltage across the circuit 1 remains below a predetermined value for a predetermined time, due for example to a failure of the source 2, the voltage relay 10 opens its contacts 24 and closes its contacts 29 thereby completing an energizing circuit for the control relay 12. This energizing circuit is from one secondary terminal of the transformer 25 through control switch 21, contacts 29 of the voltage relay 10, coil of relay 12, resistor 30, auxiliary contacts 31 on the circuit breaker 5, control switch 21 to the other secondary terminal of the transformer 25. Relay 12 by closing its contacts 33 completes a locking circuit for itself which is independent of the contacts 29 of the voltage relay 10. Relay 12 by closing its contacts 34 completes an energizing circuit for the closing coil 15 of the circuit breaker 5 so that the circuit breaker 5 closes and connects the deenergized circuit 1 to the auxiliary source 4. This energizing circuit for the closing coil 15 is from one secondary terminal of the transformer 25 through control switch 21 contacts 34 of the control relay 12, contacts 35 of the lockout relay 18, closing coil 15 of circuit breaker 5, contacts 36 of the time relay 17, contacts 37 of the control relay 13, control switch 21, to the other secondary terminal of the transformer 25. As soon as the circuit breaker 5 closes, it completes through its auxiliary contacts 38 a locking circuit for its closing coil 15 which is independent of the contacts 34 of the control relay 12 so that the closing coil 15 is not deenergized when this control relay is subsequently deenergized in response to the energization of the voltage relay 10.

When the circuit breaker 5 closes, its auxiliary contacts 31 open the above traced energizing circuit for the coil of the control relay 12 so that it is restored to its deenergized position. When the relay 12 closes its contacts 39 an energizing circuit is completed for the time relay 17. This circuit is from one secondary terminal of the transformer 25 through control switch 21, contacts 39 of the control relay 12, auxiliary contacts 40 on the circuit breaker 5, coil of the time relay 17, control switch 21 to the other secondary terminal of the transformer 25. After the time relay 17 has been energized for a predetermined length of time it opens its contacts 36 in the above traced circuit of the closing coil 15 so that the circuit breaker 5 opens and disconnects the auxiliary source 4 from the circuit.

If the circuit 1 is not reenergized by the source 2 within a predetermined time after the circuit breaker 5 opens, the voltage relay 10, which was reenergized by the closing of the circuit breaker 5, operates to open its contacts 24 and close its contacts 29 thereby completing the above-traced energizing circuit for the control relay 12. The energization of the control relay 12 then effects the closing of the circuit breaker 5 in the manner above described.

If, however, the circuit 1 is reenergized by the source 2 before the time delay voltage relay 10 opens its contacts 24 and closes its contacts 29 the relay 12 remains in its normal position and the auxiliary source 4 remains disconnected from circuit 1.

If the auxiliary source 4 fails at any time, the voltage relay 11 by opening its contacts 26 and closing its contacts 42 deenergizes the control relay 13 so that the above traced circuit for the closing coil 15 cannot be completed.

Therefore, it will be observed that if the source 2 which normally energizes the circuit 1 fails, the circuit breaker 5 is closed and opens periodically until either the source 2 reenergizes the circuit or the auxiliary source 4 fails.

If a fault occurs on the circuit 1 while the auxiliary source 4 is supplying current thereto the lockout relay 18 operates to open its contacts 35 and close its contacts 44. By opening its contacts 35, the lockout relay opens the above traced circuit for the closing coil 15 so that the circuit breaker 5 opens. Since the lockout relay is held in its lockout position by the latch 19, the circuit breaker 5 cannot be reclosed until the release magnet 20 is energized. When the circuit 1 is subsequently reenergized by its preferred source 2 so that the voltage relay 10 is energized and the control relay 12 is deenergized, and the auxiliary source 4 is also energized, a circuit is completed for the time relay 22. This circuit is from one secondary terminal of the transformer 25 through control switch 21, contacts 39 of relay 12, contacts 44 of lockout relay 18, coil of relay 22, control switch 21 to the other secondary terminal of the transformer 25. After the relay 22 has been energized a predetermined length of time it closes its contacts 45 and connects the release magnet 20 across the secondary terminals of the transformer 25 so that the lockout relay 18 is restored to its normal position and the auxiliary source is again adapted to be connected automatically to the circuit 1 when the voltage of the circuit 1 fails.

While I have, in accordance with the patent statutes, shown and described my invention as applied to a particular system and as embodying various devices diagrammatically indicated, changes and modifications will be obvious to those skilled in the art and I, therefore, aim in the appended claims to cover all such changes and modifications as fall within the true spirit and scope of my invention.

What I claim as new and desire to secure by Letters Patent of the United States, is:

1. In combination, an electric circuit, a preferred source of current for said circuit, an auxiliary source of current therefor normally disconnected from said circuit, and means responsive to the voltages of said circuit and said auxiliary source for periodically connecting said auxiliary source to said circuit and for disconnecting it from said circuit after it has supplied current thereto for a predetermined time while said preferred source is deenergized.

2. In combination, an electric circuit, a preferred source of current for said circuit, an auxiliary source of current for said circuit, means responsive to the voltage of said circuit for connecting said auxiliary source to said circuit when said preferred source is deenergized, and timing means for effecting the disconnection of said source from said circuit after it has been connected to the circuit for a predetermined time under normal load conditions thereon.

3. In combination, a normally energized circuit, an auxiliary source of current, means responsive to the voltages of said circuit and source for effecting the connection of said source to said circuit when said source is energized and said circuit becomes deenergized, and means for effecting the disconnection of said source from said circuit after it has supplied current thereto for a predetermined time under normal load conditions.

4. In combination, a normally energized circuit, an auxiliary source of current, means responsive to the voltage of said circuit for effecting the connection of said source to said circuit when the voltage of said circuit decreases below a predetermined value and timing means responsive to the connection of said source to said circuit for effecting the disconnection of said source from said circuit after it has supplied current thereto for a predetermined time under normal load conditions on said circuit.

5. In combination, a normally energized circuit, an auxiliary source of current, means responsive to the voltage of said circuit for effecting the connection of said source to said circuit when the voltage of said circuit decreases below a predetermined value, and timing means responsive to the connection of said source to said circuit and the voltage of said source for effecting the disconnection of said source from said circuit after it has supplied current thereto for a predetermined time.

In witness whereof, I have hereunto set my hand this 28th day of January, 1929.

ROBERT Y. McCULLOUGH.